United States Patent [19]

Granger

[11] Patent Number: 5,164,844
[45] Date of Patent: Nov. 17, 1992

[54] FLAT BED SCANNER

[75] Inventor: Edward M. Granger, Greece, N.Y.

[73] Assignee: Eastman Kodak Company, Rochester, N.Y.

[21] Appl. No.: 571,690

[22] Filed: Aug. 24, 1990

[51] Int. Cl.$^5$ .............................................. H04N 1/04
[52] U.S. Cl. ................................... 358/474; 358/494; 250/228
[58] Field of Search ................ 358/474, 494; 359/209, 359/211; 250/228

[56] References Cited

U.S. PATENT DOCUMENTS

| | | |
|---|---|---|
| 2,262,584 | 11/1941 | Herriott . |
| 3,537,373 | 11/1970 | Land . |
| 4,213,690 | 7/1980 | Sugiura et al. . |
| 4,259,004 | 3/1981 | Tateoka et al. . |
| 4,274,733 | 6/1981 | Sugiura et al. . |
| 4,314,154 | 2/1982 | Minoura et al. . |
| 4,322,837 | 3/1982 | Mickleson et al. ............... 359/209 |
| 4,725,893 | 2/1988 | Granger ............................ 250/228 |

Primary Examiner—Edward L. Coles, Sr.
Assistant Examiner—Thomas L. Stoll
Attorney, Agent, or Firm—Warren W. Kurz

[57] ABSTRACT

A flat bed scanner for accurate scanning of document information includes a means for moving an image-bearing member, such as a document, under a slot in a bottom of an enclosure. The enclosure has a diffusely-reflecting internal surface so as to define a light-integrating space within the enclosure. The slot and a window in the enclosure side provide access for light between the exterior and the interior of the enclosure. Means are provided for directing a scanning beam of light through the window and the slot to form a moving spot on a portion of the document. Detector means are provided for sensing the intensity of light diffusely reflected into the enclosed space from the spot. An electronic signal, related to the intensity of the reflected light, is produced to describe the scanned document information. To compensate for variation in the light path length due to an angular scanning motion, a beam path length compensation means is included. The compensation means includes a movable tapered-thickness optical plate which is positioned in the light path. As the plate is moved in a direction transverse to the light path direction, the beam encounters a varying plate cross-section such that the beam focal point changes proportionally. Movement of the plate is synchronized with the motion of the scanning beam.

12 Claims, 4 Drawing Sheets

FLAT BED SCANNER

BACKGROUND OF THE INVENTION

1. Field of the Invention

This invention relates to optical input scanners for providing electronic signals descriptive of information in a document.

2. Description of the Prior Art

In the conventional optical input scanner that uses a rotatable scanning mirror, a flat original is scanned by a moving light beam. A slit portion of the original is imaged on a projection image plane (such as a photoelectric sensor, or photosensor) by a projection optical system. However, the length of the light path between the original surface and the scanning mirror varies with the rotation of the mirror. Therefore, a problem arises in that the projected image does not remain in focus during the scan. Accurate conversion of the image to an electronic signal is thereby impeded.

In U.S. Pat. No. 2,262,584, issued to Herriott, a system is described for scanning a picture, printed page or other copy to derive image signals to be transmitted to a distant point. An oscillating mirror sweeps a spot of light from an illuminated aperture and a lens system provides a conjugate focal relation between the aperture and the copy. A reciprocating movement of an element of the lens system, synchronized with the mirror oscillations, is described as maintaining the conjugate focal relation independent of changes in the angular position of the beam and consequent changes in total light path length.

In U.S. Pat. No. 4,213,690, issued to Sugiura et al., a copying apparatus is described which includes a light path length correcting lens system. At least two movable lens groups are said to correct the length of the light path while maintaining a predetermined image forming magnification.

In U.S. Pat. No. 3,537,373, issued to Land, two lens elements within a projection optical system are described as being synchronously operated in parallel to the optic axis. Variation in the length of the light path and fluctuation of the conjugate arrangement is said to be eliminated.

U.S. Pat. No. 4,314,154, issued to Minoura et al, U.S. Pat. No. 4,274,733, issued to Sugiura et al., and U.S. Pat. No. 4,259,004, issued to Tateoka et al, are representative of further disclosures wherein apparatus is disclosed as comprising a scanning lens, imaging optical system, or image forming optical system that is adapted for focusing a light beam from a movable mirror onto a photosensitive member. Such apparatus are said to be capable of compensating the change in the light path length due to the angular sweep of the scanning beam.

Prior art approaches to the problem typically utilize moveable multiple-element optical devices. The elements include complex and costly lenses, which must be moved over relatively long distances along the optical axis of the apparatus. The lenses are moved in alignment with the optical axis. Such optical devices in the prior art are therefore complex in their operation and expensive to design and fabricate.

SUMMARY OF THE INVENTION

It is an object of the present invention to provide for accurate light beam scanning of information on a flat document on a flat surface in an inexpensive and simple apparatus.

In accordance with the present invention, the object is achieved by providing a flat bed scanner having a novel beam path length compensation means. The scanner comprises means for directing a scanning beam of light onto a document to form a moving spot. Detector means are provided for sensing the intensity of light reflected from the spot. An electronic signal, related to the intensity of the reflected light, is produced to describe the document information that has been scanned.

To compensate for variation in the light path length due to the scanning motion, a beam path length compensation means includes a movable tapered-thickness optical plate which is selectably positioned in the light path. The tapered-thickness plate is situated such that the scanning beam passes through a selected cross-section of the plate. As the plate is moved in a direction transverse to the light path direction, the beam encounters a varying plate cross-section. For each change in plate thickness, the beam focal point changes proportionally. Movement of the plate is synchronized with the motion of the scanning beam to thereby change the focal point to compensate for the light path length variation.

Embodiments of the invention include a light integrating enclosure for providing a diffusely reflected light to the detector means. Further embodiments include sensors to provide simultaneous signals indicative of the color information in the reflected light. The beam scanning means is also contemplated as including a mirror in the path of the beam and means for oscillating the mirror in a rotary motion.

A flat-bed scanner comprising the compensation means has several advantages over the prior art. The varied-thickness optical plate is a single, lightweight optical element of relatively simple construction. The optical plate is therefore inexpensive and easily moved in synchronization with the scanning beam. The requisite movement and alignment of the optical plate in the light path may be accomplished with ancillary mechanisms that are simpler than those used in the prior art for beam path length compensation.

BRIEF DESCRIPTION OF THE DRAWINGS

An embodiment of the present invention will now be described, by way of example, with reference to the accompanying drawings.

DETAILED DESCRIPTION OF THE PREFERRED EMBODIMENT

The preferred embodiment is intended for use in the graphic arts industry and provides three color signals representative of information in a scanned image-bearing member. The contemplated scanner is particularly useful in the reproduction of a high-resolution polychromatic image-bearing member. The image content of such a member may be quite diverse and includes, for example, photographs, line art, textual information, detailed maps, charts, and the like. The image content may be scanned for color separation data to be incorporated in masters useable in offset printing, xeroprinting, lithoprinting, or other image reproduction apparatus. The invention may also be utilized in the production of a composite multicolor print in a xerographic copying apparatus.

The invention, however, is not limited to use with input scanners in reproduction apparatus, and may be used with other beam scanning apparatus wherein an angularly scanned light beam is focussed on an image plane. For example, the invention can be used in a variety of known systems in which an image is read by a scanning beam exposure of a flat original. Such systems may utilize beam scanning for image reading or image transmission according to techniques inthe photographic, data recording (archiving), data transmission, and radiographic arts.

Because graphic arts reproduction apparatus are well known, the present description will be directed in particular to elements forming part of, or cooperating more directly with, the invention. Apparatus not specifically shown or described herein are selectable from those known in the prior art.

Figure 1:
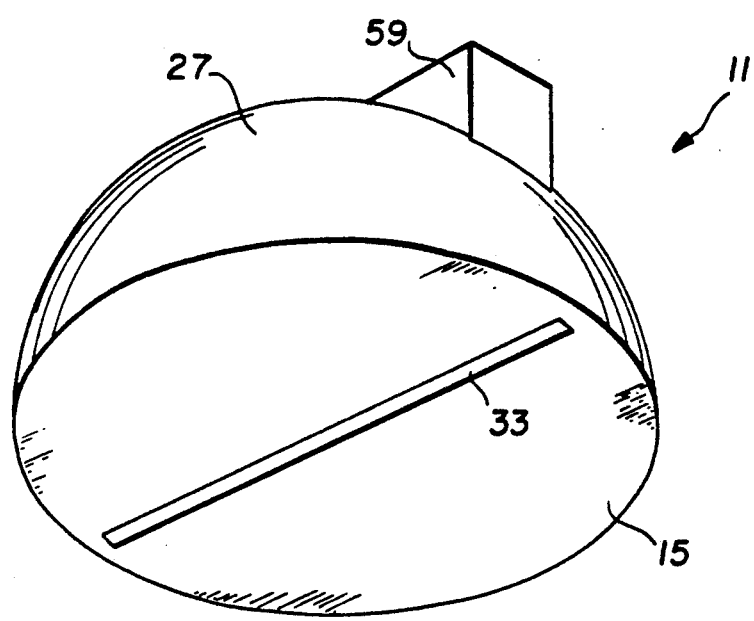
FIG. 1 is a perspective view of a flat bed scanner embodying the beam path length compensation means according to the invention, with parts omitted for the sake of illustration and understanding.
Figure 2:
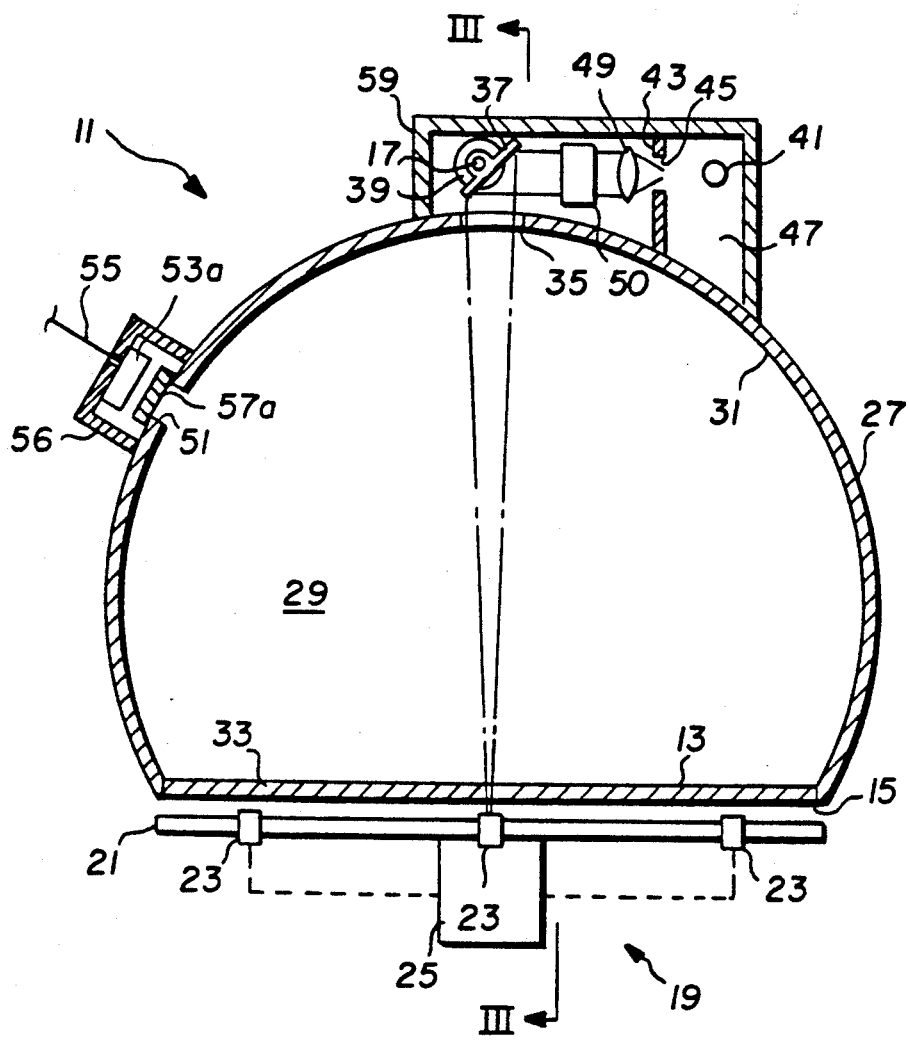
FIG. 2 is a sectional view of the scanner taken on the line II—II in FIG. 3.
Figure 3:
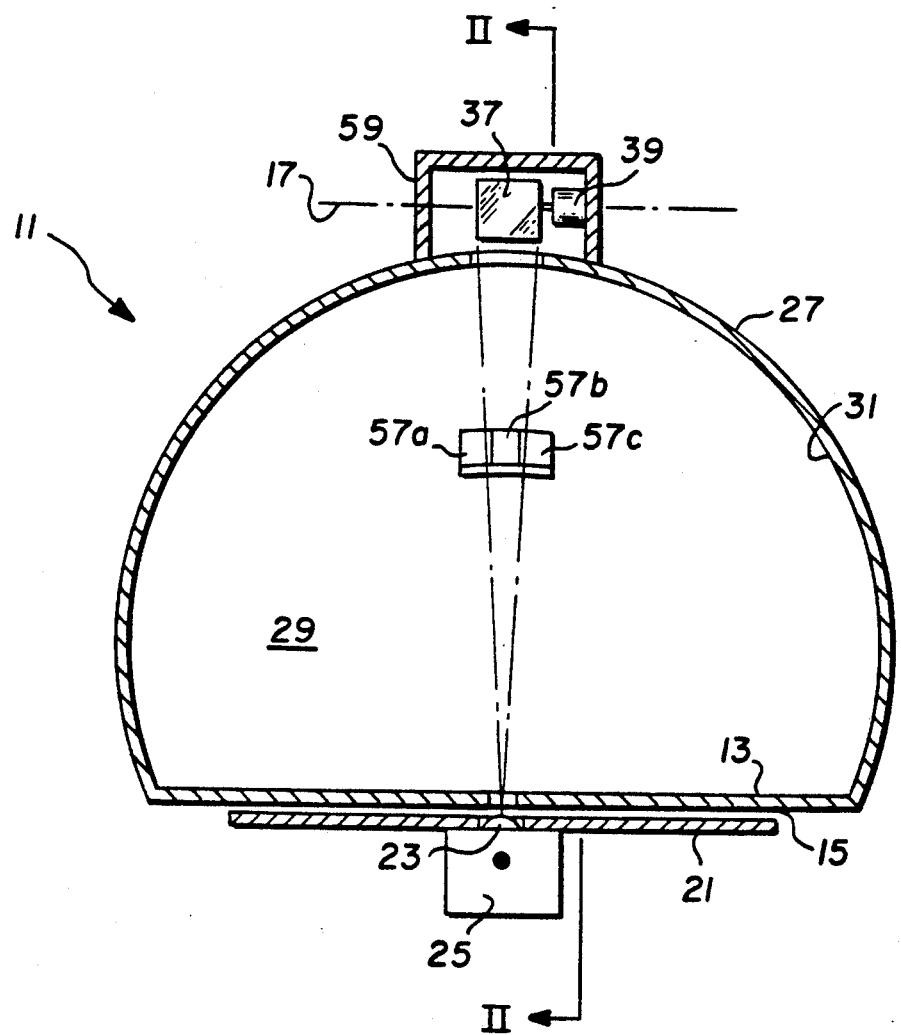
FIG. 3 is a sectional view at right angles to the view of FIG. 2, taken on the line III—III in FIG. 2.

According to FIGS. 1-3, there is shown a flat bed light beam scanning apparatus, or scanner 11, constructed according to the present invention. The scanner 11 includes a platen 13. The platen 13 has a flat bottom surface or underside 15. There are means 19 for moving a flat image-bearing member, or document, in parallel with an axis 17 (FIG. 2) under the platen 13 in contact with the underside 15. The document moving means 19 include a shroud 21 and driving rollers 23. The shroud 21 conforms to the underside 15 and is spaced from it by a distance just sufficient to allow a document to pass between the shroud 21 and the underside 15. The driving rollers 23 are driven in rotation by a common drive 25 to have uniform peripheral speed. The rollers nip a document against the platen underside 15 and, when rotated, move the document in a direction parallel to the axis 17. The document moving means 19 are omitted in the perspective view illustrated in FIG. 1, so that the platen surface 15 may be seen.

Attached at the upperside of the platen 13 is an opaque enclosure 27. In the preferred embodiment, the enclosure 27 is spherical. The enclosure 27 bounds an enclosed integrating space 29. The interior surface 31 of the spherical enclosure 27 is white and is a diffuse reflector; for example, it may be painted with titanium white paint.

The platen 13 has a slot 33 disposed in the midline of the platen. The slot 33 is narrow in the direction parallel to the axis 17 and is elongate in the plane to which the axis 17 is perpendicular.

A window 35 in the spherical enclosure 27 provides access for light between the exterior and the interior of the enclosure 27. The window 35 is located across the plane containing the slot 33 to which the axis 17 is perpendicular. That is, the window 35 is located on a diameter of the spherical form of the enclosure 27, whereby the diameter both intersects the axis 17 and passes through the center of the slot 33. The disposition and size of the window 35 is such that all parts of the slot 33 may be seen from the axis 17 through the window 35.

Outside the window 35 there is a mirror 37 which is mounted for rotational oscillation about the axis 17. The mirror 37 is driven in oscillation at high frequency by a galvo-drive 39. As may be observed, the axis 17 is outside the enclosure 27 so that the mirror may also be outside the enclosure 27.

A source of white light which, in the present embodiment, is a halogen incandescent bulb 41, is disposed in a light-tight chamber 47. A portion of the emitted light passes through one wall 43 by way of an aperture 45. A lens 49 focuses an image of the pinhole 45 through a beam length compensation means 50 onto a document (not shown) held against the platen surface 15. As may be seen in FIG. 2, the ray path between the lens 49 and the document on the platen surface 15 is folded by the mirror 37. The line of the axis of the portion of the beam within the enclosure 27 intersects the axis 17.

The opaque enclosure 27 has a second window 51 behind which are mounted, on the outside of the enclosure, detector means in the form of three light-sensitive charge-coupled devices (CCD) 53 and signal carrying leads 55. The detectors 53a, 53b, 53c, transmit signal values which are characteristic of the intensity of the detected light. The detectors 53 are disposed in a light-tight enclosure 56.

Each detector 53a, 53b, and 53c respectively includes a filter 57a, 57b, 57c. The filters allow different portions of the light spectrum to reach the different detectors 53a, 53b, 53c so that each detector produces a signal that is characteristic of the intensity of light in a respective portion the spectrum.

The lens 49 and its galvo drive 39 are disposed in a light-tight enclosure 59 which includes an apertured inner wall 43. The mirror galvo-drive 39 is energized so that it oscillates the mirror 37 through an angle half that subtended by the document at the axis 17. The oscillating mirror 37 causes the spot of light to scan the full width of the document on the platen surface 15.

The drive 25 is energized and rotates the rollers 23 to move the document over the platen surface 15 in a direction parallel to the axis 17. The document is moved at a speed depending on the rate of scan of the mirror and the desired density of scan lines on the document. Light incident on the document in the spot is reflected into the integrating space 29. Light which is reflected from the document is incident on the reflecting interior surface of the opaque enclosure.

The diffusely reflected light passes through window 51 and is selectively filtered through the filters 57a, 57b, 57c. The detectors 53a, 53b, 53c create signals indicative of the intensity of light incident on them. The signals are, therefore, indicative of the color and brightness of the small region of the document on which the spot of light is instantaneously incident. The color and brightness represent the information obtained by the scanning of the document.

With continued and repetitive beam scanning, a line-by-line image of the document is converted to corresponding electrical signals. Such signals may be sent to a host computer where they can be displayed, manipulated (for example, to edit the original document), and used by ancillary graphics arts apparatus for reproduction of the electronically-generated information. If desired, the electrical signals from the scanner 11 may first be be stored within known data storage apparatus.

Because the platen surface 15 is flat, and due to the oscillating rotary motion of the mirror 37, the spot would not remain 'in focus' throughout its angular scanning motion without the compensation provided by the beam length compensation means 50.

Figure 4:
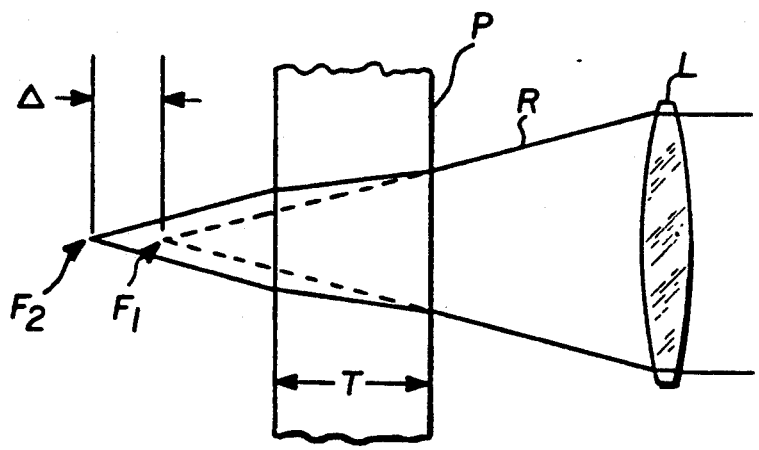
FIG. 4 is a side sectional view of a portion of a plane-parallel optical plate which demonstrates the beam path length variation process used in the invention.

Turning now to FIG. 4, the basis for the contemplated beam length compensation is illustrated.

FIG. 4 shows a lens L illuminated by light from an aperture (not shown). The lens L, in air, would normally form an image at $F_1$. The insertion of a plane parallel plate P of thickness T between the lens and $F_1$ will displace the image to $F_2$. If the path of the light rays is traced through the plate P, a ray R emerging from the plate has exactly the same slope angle that it had before passing through the plate (by Snell's Law). Therefore, the effective focal length of the Lens L, and the size of the image, are unchanged by the insertion of the plate P.

The amount of longitudinal displacement $\Delta$ of the image is readily determined by the application of paraxial ray tracing formulae and is equal to $[(N-1)/N] \cdot T$, where N=refractive index of the plate material.

Figure 5:
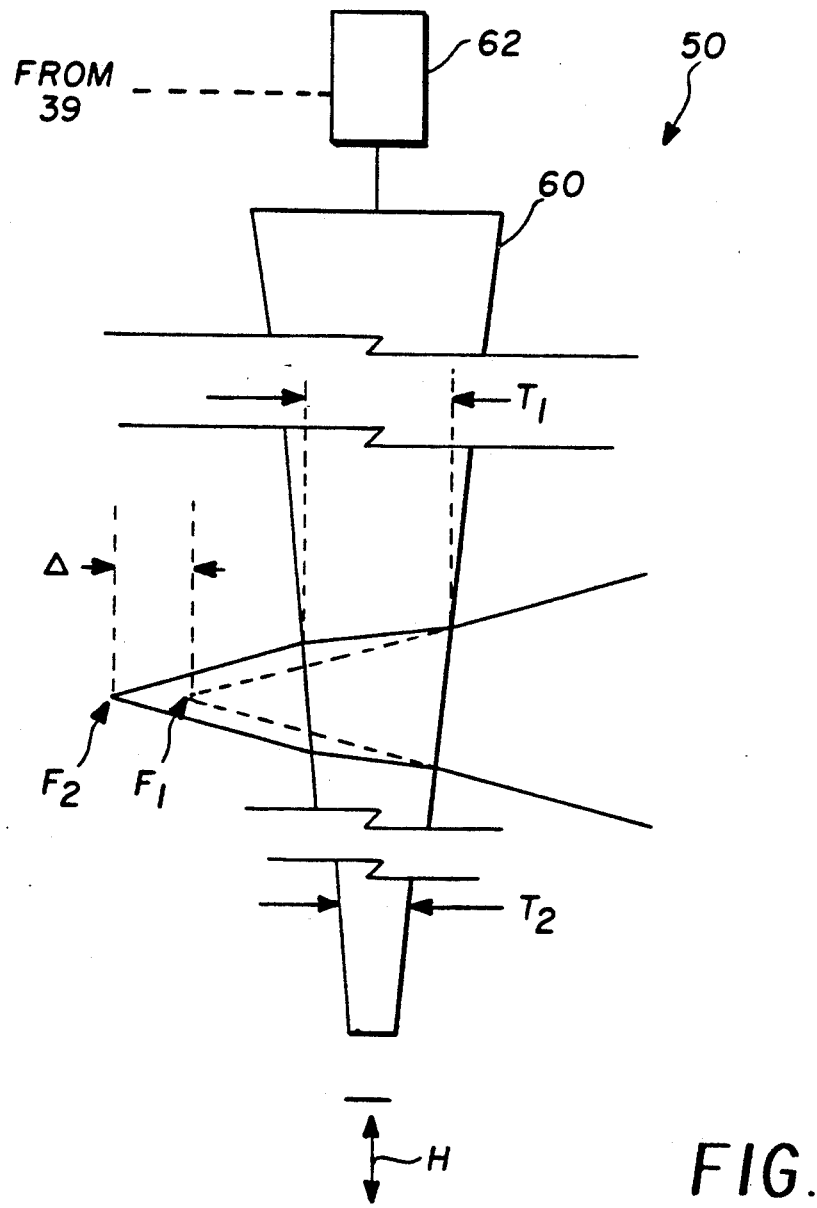
FIG. 5 is a side sectional view similar to that of FIG. 4 but of an embodiment of a tapered-thickness optical plate contemplated for use in the scanner of FIGS. 1–3.

With reference now to FIG. 5, the operation of the contemplated beam path length compensation means 50 may be understood. A tapered-thickness optical plate 60 is suspended in the beam path such that rays R pass through a selected cross-section of the plate. The taper is sufficiently gradual such that the plane parallel plate illustrated and discussed with respect to FIG. 4 is approximated. The plate thickness varies continuously from a given amount, represented by a first thickness $T_1$, to a lesser thickness, represented by a second thickness $T_2$. A plate oscillator 62 is driven by the mirror galvo-drive 39 such that the plate 60 is moved in synchronism with the oscillation of the mirror 37 to achieve a respective variation $\Delta$ in the beam focal point.

The beam path length is compensated by moving the plate 60 such that the beam encounters a smoothly continuous range of thicknesses $T_1$ to $T_2$ and back to $T_1$ over one full sweep of the beam scan. A lesser thickness, for example, at thickness $T_2$, is thus encountered by the beam at the midpoint of the beam scan, where the path length is the shortest and the required compensation is minimal. Conversely, a greater thickness $T_1$ is encountered by the beam at the extremes of the beam scan, where the required path length compensation is the greatest.

Suitable known means within the plate oscillator, such as a piezoelectric crystal and associated excitation and signal conditioning electronics, convert the drive signal into the requisite push-pull movement of the plate 60 to achieve the desired transition in the plate position H. Accurate compensation of the image point form, for example, $F_1$ to $F_2$ is then achieved by variation of the plate position H such that the beam is incident on corresponding plate sections having thicknesses $T_1$ to $T_2$. Accordingly, the beam scanning may be affected on a flat document without experiencing the deleterious effects of beam path length variation.

In the embodiment described above, the mirror 37 and its galvo-drive 39 impart a scanning motion to the light beam. In other embodiments, other scanning means may be adopted, for example, a reflective rotatable polygon may be used. Such a polygon includes a plurality of planar mirrors mounted for rotation about a common axis and driven in rotation by a motor. In an embodiment including a polygon, the common axis about which the mirrors are mounted is coincident with the axis of the cyclindrical surface of the platen.

While the light-sensitive devices have been described above as being CCD's, other devices, such as photomultiplier detectors may be used. Other embodiments of the invention may include different numbers of light-sensitive devices and filters. Also, other shapes of boundary enclosures for the integrating space may be adopted. However, a spherical enclosure provides the most efficient use of light and avoids 'hot spots' and other problems with positioning of the light sensitive devices.

The invention has been described with reference to its preferred embodiments. However, variations and modifications can be effected within the spirit and scope of the invention.

What is claimed is:

1. A light beam scanner for providing a signal which characterizes information in a document, comprising:

means for angularly scanning a beam of light onto the document;

means compensating for path length variation in the scanning beam, including:

a moveable tapered-thickness optical plate, means for selectively positioning the optical plate in the beam path, and means, responsive to the angular position of the beam, for selecting the plate thickness encountered by the beam; and detector means for sensing the intensity of light reflected by the portion of the document illuminated by the beam and, responsive to the sensed intensity, for providing a signal characteristic of the document information illuminated by the scanning beam.

2. A light beam scanner as claimed in claim 1, wherein:

the means for directing a beam of light directs a beam of white light; and the detector means comrises a plurality of sensors each having a respective filter, each filter being adapted to pass a different portion of the light spectrum, and the respective sensor being adapted to provide a signal indicative of the intensity of the portion of the spectrum passed by the filter.

3. A light beam scanner as claimed in claim 2, wherein the sensors are charge-coupled devices.

4. A light beam scanner as claimed in wherein said scanning means comprises a mirror positionable in the path of the beam and means for oscillating the mirror in rotary motion.

5. A light beam scanner as claimed in claim 1 wherein the means for selecting positioning optical plate further comprises:

a pizoelectric element; and piezoelectic element excitation means being driven by the mirror oscillation means to cause the element to selectively position the tapered-thickness optical plate.

6. A light beam scanner as claimed in claim 4, comprising light beam directing means including an enclosure having an aperture;

a halogen incandescent bulb illuminating the aperture; and a lens for focussing light from the aperture into a spot.

7. A light beam scanner for providing a signal which characterizes information in a document, comprising:

a platen having a slot;

means for moving a document in contact with the platen;

an enclosure bounding a side of the platen and an enclosed integrating space, the slot being open to the enclosed space and the enclosure having a diffusely-reflecting internal surface;

means for directing a beam of light through the the slot to form a spot on that portion of a document adjacent the slot in the platen;

means for imparting an angular scanning motion to the beam so that the spot scans the document;

means for compensating path length variation in the scanning beam, including:
   a moveable tapered-thickness optical plate,
   means for selectively positioning the optical plate in the beam path, and
   means, responsive to the angular position of the beam, for selecting the plate thickness encountered by the beam; and detector means for sensing the intensity of light diffusely reflected into the enclosed space by the portion of the document illuminated by the spot and, in response to the intensity, providing a signal which characterizes the information in the illuminated portion of the document.

8. A light beam scanner as claimed in claim 7, wherein:
   the enclosure includes a window providing access for light between the exterior and the interior of the enclosure;
   the means for directing a beam of light directs a beam of white light through the window; and
   the detector means comprises a plurality of sensors each having a respective filter, each filter being adapted to pass a different portion of the light spectrum, and the respective sensor being adapted to provide a signal indicative of the intensity of the portion of the spectrum passed by the filter.

9. A light beam scanner as claimed in claim 8, wherein the sensors are charge-coupled devices.

10. A light beam scanner as claimed in claim 7, wherein the means for imparting a scanning motion to the beam further comprises a mirror positionable in the path of the beam and means for oscillating the mirror in rotary motion.

11. A light beam scanner as claimed in claim 10, wherein the means for selectively positioning the optical plate further comprises:
   a piezoelectric element; and
   piezoelectric element excitation means being driven by the mirror oscillation means to cause the element to selectively position the tapered-thickness optical plate.

12. A light beam scanner as claimed in claim 10, wherein the light beam directing means further comprises:
   an enclosure having an aperture;
   a halogen incandescent bulb illuminating the aperture; and
   a lens for focussing light from the aperture into the spot.

* * * * *

UNITED STATES PATENT AND TRADEMARK OFFICE
CERTIFICATE OF CORRECTION

PATENT NO. : 5,164,844
DATED : November 17, 1992
INVENTOR(S) : Edward M. Granger It is certified that error appears in the above-indentified patent and that said Letters Patent is hereby corrected as shown below:

Column 6, line 19, after the word "means", the word --for-- should be inserted.
Column 6, line 46, after the word "in", the following should be inserted --Claim 1,--.
Column 6, line 51, the word "selecting" should be replaced with the word --selectively--.
Column 6, line 51, after the "positioning", the word --the-- should be inserted.
Column 6, line 53, the word "pizoelectric" should be spelled --piezoelectric--.
Column 6, line 54, the word "piezoelectic" should be spelled --piezoelectric--.
Column 8, lines 28 & 29, the words "the spot" should be replaced with the words --a spot--.

Signed and Sealed this

Second Day of August, 1994

*Attest:*

BRUCE LEHMAN

*Attesting Officer*   *Commissioner of Patents and Trademarks*